United States Patent [19]

Friedman et al.

[11] Patent Number: 4,790,997
[45] Date of Patent: Dec. 13, 1988

[54] FOOD STUFFS CONTAINING STARCH OF AN AMYLOSE EXTENDER DULL GENOTYPE

[75] Inventors: Robert B. Friedman, Chicago, Ill.; David J. Gottneid, Griffith, Ind.; Eugene J. Faron, Schererville, Ind.; Frank J. Pustek, Munster, Ind.; Frances R. Katz, Crown Point, Ind.

[73] Assignee: American Maize-Products Company, Stamford, Conn.

[21] Appl. No.: 69,264

[22] Filed: Jul. 2, 1987

[51] Int. Cl.$^4$ .................. A23L 1/04; A23L 1/195
[52] U.S. Cl. ............................. 426/578; 426/397; 426/407
[58] Field of Search ............... 426/578, 579, 589, 658, 426/549, 935, 397, 407; 127/29, 32; 536/102

[56] References Cited

U.S. PATENT DOCUMENTS 4,107,338 8/1978 Tutor et al. .................. 426/549
4,428,972 1/1984 Wurzburg et al. .................. 426/578

OTHER PUBLICATIONS

CA 94(21):170612j, Liu, T. T., 1981.
CA 93(5):41737, Soberalski, R. M., 1980.
CA 92(13):107518b, Garwood, D. L., 1980.
CA 85(13):92388p, Garwood, D. L., 1976.
CA 91(21):171713t, Gentinetta, E., 1979.
84:282833, Biosis, 1983, Inouchi, N.
Genetics and Physiology of Starch Development—Chapter III—Jack C. Shannon and Douglas L. Garwood-pp. 25-85.
Agronomy Journal—vol. 50, (1958)—Gene Interactions in Maize Affecting Endosperm Properties—H. H. Kramer et al., pp. 207-210.
Cereal Chemistry—vol. 39, Nos. 1-6, Jan.-Nov. 1962—The Digestibility of High-Amylose Corn Starches Compared to that of Other Starches—Rudolph M. Sandstedt et al.—pp. 123-131.

Primary Examiner—Jeanette Hunter
Attorney, Agent, or Firm—Lucas & Just

[57] ABSTRACT

A thickened foodstuff containing a starch extracted from a starch bearing plant having an amylose extender dull genotype is disclosed. Maize is the preferred plant. The starch exhibits low gelatinization temperature with an amylose content greater than 50%. A method for making the canned foodstuff containing the starch is also disclosed.

10 Claims, 1 Drawing Sheet

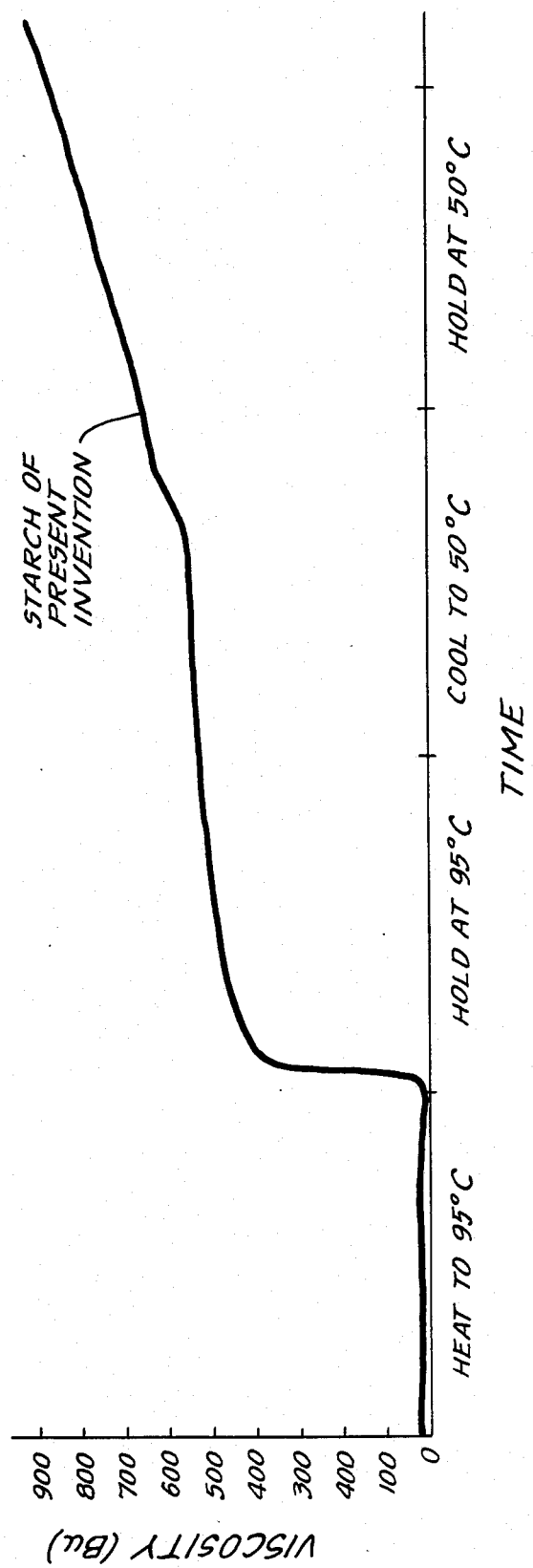

FOOD STUFFS CONTAINING STARCH OF AN AMYLOSE EXTENDER DULL GENOTYPE

This invention relates to starch and more particularly to starch which has been extracted from a plant having an amylose extender dull (aedu) homozygous genotype.

Starch occurs in a variety of plants and is generally categorized based on its plant source. For example, cereal starches are extracted from cereal grains such as maize, rice, wheat, barley, oats and sorghum; tuber and root starches are extracted from plants such as potato, sweet potato, arrowroot, yams and cassava; and waxy starches are extracted from plants such as waxy maize, waxy rice, waxy barley and waxy sorghum.

Generally, starch is comprised of two polymers, amylose and amylopectin which are intertwined to form a starch granule. Amylose is a linear polymer of alpha 1-4 bonded anhydroglucose units while amylopectin is a branched polymer comprised of linear chains of alpha 1-4 linked anhydroglucose units with branches resulting from alpha 1-6 linkages between the linear chains.

Each starch bearing plant produces different percentages of amylose and amylopectin, different size granules and different polymeric weights for both the amylose and amylopectin. These differences produce markedly different properties in the starch.

Heretofore, the only way to affect the properties of starch was to physically and/or chemically treat the starch.

It has recently been discovered that there exists a number of recessive mutant genes in starch bearing plants which have an affect on the properties of starch and that by controlled breeding these mutant genes can be expressed.

Some of the mutant genes which have been identified in maize include the genotypes: waxy (wx), amylose extender (ae), dull (du), horny (h), shrunken (sh), brittle (bt), floury (fl), opaque (o), and sugary (su). Nomenclature for some of these mutant genes is based in part on the effect these mutant genes have on the physical appearance, phenotype, of the kernel. It is also known that within these genotypes there are genes which produce starches with markedly different functional properties even though the phenotypes are the same. Such subspecies have generally been given a number after the named genotype, for example, sugary-1 (su1) and sugary-2 (su2).

One combination of these mutant genes which has been found to possess utility is taught in U.S. Pat. No. 4,428,972 issued January 31, 1984 to Wurzburg et al.

It has now been discovered that a plant having an amylose extender dull (aedu) homozygous genotype will produce a starch having a high amylose content with a gelatinization temperature significantly lower than conventional high amylose starches having comparable amylose content. Specifically, it has been discovered that the starch of the present invention has a gelatinization temperature about 5° C. lower than high amylose starches with comparable amylose content.

It has also been discovered quite unexpectedly that the novel starch of the present invention possesses thin-thick attributes comparable to chemically modified starches used in canning.

FIG. 1 illustrates a Brabender amylogram of the starch of the present invention.

Conventional high amylose starches, amylose content equal to or greater than 50%, have a high gelatinization temperature, above about 80° C. Such a high gelatinization temperature increases the processing costs associated with conventional high amylose starch.

The discovery of a high amylose starch with a gelatinization temperature below that of conventional high amylose starch can yield a cost savings to the user. Such high amylose starches are especially useful in foods, paper manufacture and fiberglass sizing.

One area of chemically modified starches that has received a great deal of attention is the area of canning starches or thin-thick starches. These starches have a specific utility in canning processes in which high temperatures are obtained rapidly and maintained for sterilization of a foodstuff. The starch is typically added to the foodstuff to provide viscosity to the foodstuff. The name thin-thick is given to these starches because of their viscosity behavior, low or thin viscosity initially to allow rapid heat penetration to facilitate sterilization, increased or thick viscosity after sterilization to add body to the canned foodstuff. The term canning as used in the specification and claims means the act of preserving by heat whether the heat is applied before or after the packaging of the food and regardless of the form of the package. Canning includes for example pouch packaging, canning, aseptic pack and retorting. Generally, thin-thick starches are chemically modified. A thin-thick starch specifically developed for retorting is taught in U.S. Pat. No. 4,120,983 issued October 17, 1978 to del Valle et al. The starch taught by the '983 patent is a hydroxypropylated, epichlorohydrin cross-linked tapioca and corn starch derivative.

The discovery that the starch of the present invention can replace these so-called thin-thick chemically modified starches provides economic advantages.

In order to obtain substantially pure starch in accordance with the present invention, a plant which produces edible starch and has an amylose extender (ae) genotype is crossbred with a plant which produces edible starch and has a dull (du) genotype to produce a plant having an amylose extender dull (aedu) homozygous genotype. The starch is then extracted from this plant. Both the crossbreeding step and the extraction step of the present invention are carried out in a conventional manner.

In order to prepare a sol in accordance with the present invention, a slurry is prepared which comprises water and an effective amount of starch extracted from a plant of the aedu genotype and the slurry is subject to a cooking step. The slurry is cooked as necessary to provide a thickener composition which exhibits characteristics comparable to sols made from conventional high amylose thickener compositions except that less energy is needed to cook the high amylose starch of the present invention compared to the conventional high amylose starch. The preferred amount of starch of the present invention used in the slurry constitutes about 1 to 20% by weight of slurry. Generally, cooking entails raising the temperature of the slurry to above about the gelatinization temperature of the starch and subjecting the starch to enough shear such that the granules rupture and a paste is formed. It is not necessary that all the granules rupture. Conventional high amylose starches are cooked with special equipment such as jet cookers. Using starch of the present invention, such special equipment is not necessary.

A sol or a thickener composition of the starch of the present invention is added to a foodstuff in a conventional manner in order to provide the benefits of high amylose starch to the foodstuff.

Alternatively, starch of the present invention is mixed with a foodstuff or a slurry comprising water and starch of the present invention is mixed with foodstuff and the resulting mixture cooked to produce a thickened foodstuff and to provide the benefits of a high amylose starch to the foodstuff.

In order to replace high amylose or chemically modified starch with starch of the present invention, a replacement ratio of about 1:1, conventional starch:starch of the present invention, may be employed. Larger or smaller amounts of the starch of the present invention may be used to replace the conventional starch.

The starch of the present invention is employed as a thin-thick starch in canning by mixing the starch of the present invention, a slurry or a sol containing the same with a foodstuff suitable for canning. Generally, water is included in this mixture. Conventionally, the pH of such a mixture is adjusted, subsequently sealed in a container and subjected to a conventional canning process. During such canning process, the contents of the container preferably reaches above about 220° F. for a period of about 5 to about 25 minutes thereby sterilizing the contents of the sealed container. The amount of starch of the present invention employed for such a canning process is an effective amount. Preferably, the starch of the present invention is employed in an amount of about 1 to about 20% by weight based on the total weight of the container content. The starch of the present invention, a slurry or a sol containing the same is conventionally mixed with the foodstuff.

The term starch as used in the specification and claims means not only the substantially pure starch granules as extracted from a starch bearing plant but also grain products of the starch granule such as flour, grit, hominy and meal.

The term amylose extender dull or aedu genotype as used in the specification and claims means not only the aedu homozygous genotype, aeaedudu, which has been obtained by standard plant breeding techniques but also the aedu genotype which has been moved to another portion of the plant genome by translocation, inversion or any other method of chromosome engineering to include variations thereof whereby the disclosed properties of the starch of the present invention are obtained.

The term high amylose starch means starch having about 50% and above amylose based on the total weight of amylose and amylopectin in the starch granule. Conventional cereal and tuber and root starches have about 20% by weight amylose, while waxy starches generally have less than about 1% amylose.

Any plant source which produces edible starch and which can be crossbred to produce a plant having a aedu homozygous genotype may be used. It has been found that the amylose extender (ae) mutant gene is present in maize and barley and the dull (du) genotype is present in maize. Maize is the preferred plant source. The amylose extender gene and the dull gene are reported to be located on chromosome 5 and chromosome 10 respectively, of the maize chromosomes. The location of such genes is published in the open literature.

Generally, to obtain a starch bearing plant with both double recessive mutants of the ae and du genotype, a plant of an ae mutant is crossed with a plant having a du mutant and thereafter inbred to obtain a plant homozygous in aedu. After the homozygous aedu genotype is obtained, standard breeding techniques are used to obtain hybrid vigor. Hybrids are preferred because of their high starch yield compared to inbred lines. The method of crossing plants and of obtaining specific genotypes in the offspring as well as breeding to obtain hybrid vigor is well known.

Extraction of starch from the plant is well known and typically entails a milling process. In accordance with the present invention, a wet milling process is used to advantage to extract the corn starch from the corn kernels. Corn wet milling comprises the steps of steeping and grinding the corn kernel and then separating the starch from the other components of the kernel. Prior to steeping, the kernels are subjected to a cleaning process to remove any debris which may be present. This cleaning process is usually done at the wet milling plant. The kernels are then steeped in a steep tank where the kernels are contacted with a countercurrent flow of water at an elevated temperature of about 120° F. and containing sulfur dioxide in an amount between about 0.1 to about 0.2% by weight water. The kernels are maintained in the steep tank for about 24 to 48 hours. Next, the kernels are dewatered and subject to a first set of attrition type mills.

The first set of mills generally grind and rupture the kernels causing the germ, corn oil, to be released from the rest of the kernel. A typical attrition type mill used in commercial wet milling processes is sold under the brand name Bauer. The released germ is then separated from the other parts of the kernel by centrifugation. Throughout the grinding steps of the wet milling process the kernel and the kernel components are maintained in a slurry of about 40% by weight solids.

The remaining kernel components which include starch, hull, fiber and gluten, are subjected to a second set of attrition type mills such as the Bauer Mill, to further grind the components and separate the hull and fiber from the starch and gluten. Hull and fiber are generally referred to as bran. Washing screens are used to separate the bran from the starch and gluten. The starch and gluten pass through the screens while the bran does not.

Next, the starch is separated from the protein. This step is done either by centrifugation or by a third grind followed by centrifugation. A commercial centrifugation separator suitable for the present process is the Merco centrifugal separator.

The slurry which contains the starch granules is then dewatered and the resulting granules washed with fresh water and dried in a conventional manner preferably to about 12% moisture.

In this manner, the substantially pure starch of the present invention is extracted from a starch bearing plant of the aedu genotype.

Alternatively to the drying step, the starch may be left in suspension and subject to further modification.

Modification of the starch may also be performed on the dried starch. Typically, in order to change the physical and/or chemical structure of the starch granule, the starch is subject to any one or more of eight general treatments. These treatments comprise bleaching, thin boiling, acid treatment, enzyme treatment, dextrinization or dry roasting, etherification, esterification, and crosslinking. Starches which have been treated by any one or more of these eight treatments listed above are conventionally referred to as chemically modified starch.

Bleaching, often referred to as oxidation, is a modification which does not appreciably alter the granular structure of the starch. Oxidation does, however, tend to lighten the color of the granules and reduce the viscosity of the starch paste.

In order to bleach the starch of the present invention, a slurry of starch is prepared of about 5 to about 40% by weight starch. To the slurry sodium hypochlorite is added with about 6% available chlorine (free chlorine) and the slurry is held at about 110° F. for between about 1 to about 20 hours. The slurry is then neutralized with sodium bisulphite and the resulting granules are dewatered, washed and dried in conventional manner.

Such modification makes the starch of the present invention suitable for laundry starch, paper coating and as a textile size.

In order to produce a thin boiled starch of the present invention, a slurry of starch is prepared of about 5 to about 40% by weight starch. To this slurry, a mineral acid is added and allowed to react with the starch for about 1 to about 100 hours at about 90° to about 120° F. with constant agitation. Such a reaction is done below the gelatinization temperature of the starch. Subsequently, the solution is neutralized, dewatered, washed and dried in conventional manner.

Thin boiling leaves the granules intact and produces a starch product which has a slight reduced viscosity compared to the non-thin boiled starch. If partial or total destruction of the starch granule is sought, the granule may be subjected to acid treatment.

In order to acid treat the starch of the present invention, a slurry of starch about 5 to about 40% by weight starch is prepared. This slurry is reacted with acid, generally a strong acid, at a temperature above gelatinization temperature. Such a procedure is preferably carried out by jet cooking the slurry through a conventional jet cooker with or without acid already in the slurry and then allowing the slurry to react with the acid, adding acid if needed, for a desired period of time or until the desired dextrose equivalent (DE) is reached. The DE is roughly proportional to the length of time for the reaction. Generally, such jet cooking destroys the starch's granular structure.

After acid treatment, the resulting slurry is neutralized, dewatered and dried. Such product may also be subject to conventional carbon treatment and filtration prior to dewatering and drying. Another treatment which degrades the granular structure is enzyme treatment.

In order to enzyme treat the starch of the present invention, a slurry of starch is made up having about 5 to about 40% by weight starch. To this slurry, enzyme is added at the optimum pH and temperature for the enzyme. Some advantage is found by first jet cooking the slurry to open up the starch granules, cooling the slurry to optimum temperature for the enzyme and then adding the enzyme. If the enzyme is jet cook stable then the enzyme can be added to the slurry prior to jet cooking. The slurry may also be treated with acid first to a low DE and then enzyme treated. After enzyme treatment, the product is dewatered and dried. Alternatively, the product may be subject to conventional carbon bleaching and filtration prior to concentration and/or drying.

In order to dextrinize or dry roast the starch of the present invention, acid is added to dry starch granules and the mixture is heated to a temperature of about 250° to about 350° F. for about 3 to about 72 hours. The product, once removed from the heat, is sold as is. The preferred acids are hydrochloric, phosphoric and any mineral acid. Such a method causes the partial breakdown of the granular structure.

In order to etherify the starch of the present invention, a slurry of starch is made up having about 5 to about 40% by weight starch. The pH of the slurry is adjusted to about 10 to about 12 preferably with sodium hydroxide. Next, an etherification agent such as ethylene oxide or propylene oxide is added to the slurry in an amount of about ½ to about 25% depending on the desired degree of substitution. The reaction conditions are held for about 5 to about 30 hours at about 70° to about 120° F. The slurry is then neutralized with any known acid, dewatered, washed and dried.

In order to crosslink the starch of the present invention, a slurry of starch is made up of about 5 to about 40% by weight starch. The pH of the slurry is adjusted to about 8 to about 12 preferably with sodium hydroxide. Optionally, a salt may be added to the slurry to affect swelling of the granules. Then the slurry is reacted with a crosslinking agent such as phosphorous oxychloride, trimetaphosphate salt, or epichlorohydrin at about 70° to about 120° F. for about ½ to about 5 hours. The length of time of the reaction will depend on the amount of crosslinking agent used and the specific crosslinking agent chosen.

In order to esterify the starch of the present invention, a slurry of starch is prepared having about 5 to about 40% by weight starch. The pH of the slurry is then adjusted to about 8 to about 10 and an esterification agent is added to the slurry such as vinyl ester, acetyl halides, acid anhydrides like acetic anhydride, or succinic anhydride. The esterification agent is added slowly while maintaining the pH of the slurry. The reaction is continued for about ½ to about 5 hours at about 80° to about 120° F. Once the reaction is completed to the desired degree of substitution, the slurry is neutralized, dewatered, washed and dried.

Any combination of these modifications may be employed on starch of the present invention.

It has been found that a sol comprising water and an effective amount of starch extracted from a plant of a aedu genotype exhibits thickening characteristics which makes the sol a good commercial thickener composition. Such thickener compositions are especially useful in foodstuffs.

The sol is prepared by forming a slurry of water and starch of the present invention and subsequently cooking the slurry thereby forming a paste. Preferably, the sol contains the starch of the present invention in the amount of about 1 to about 20% by weight total sol. The slurry is cooked at a temperature of about 90° C. and above to provide thickening characteristics prior to adding to the foodstuff. Cooking time is about 10 minutes. The sol in accordance with the present invention need not be cooked if the starch has already been subjected to a process which makes it cold water swellable. Cooking generally comprises raising the temperature of an aqueous slurry of the starch of the present invention to the gelatinization temperature of the starch and subjecting the starch to shear such that the starch granules rupture and form a paste.

In order to prepare the thickened foodstuff, a sol made in accordance with the present invention is combined with a foodstuff and the composition is cooked to the necessary degree to provide a thickened foodstuff. Conventional mixing is employed to combine the sol with the foodstuff. Cooking of the sol and foodstuff composition is also carried out in a conventional manner.

Alternatively, starch of the present invention is mixed with the foodstuff or a slurry comprising the starch of the present invention and water is mixed with a foodstuff and the resulting mixture is cooked to the desired degree to obtain a thickened foodstuff. When the starch itself or a slurry containing the starch itself is mixed with a foodstuff, the resulting mixture must be cooked in order to provide a thickened foodstuff. The mixing as well as the cooking is accomplished in a conventional manner. Cooking is carried out at a temperature of about 90° C. and above. Cooking time is about 10 minutes but may vary depending on the amount of foodstuff present and the amount of shear that the mix is subject to during cooking.

Such a thickener composition provides high amylose characteristics, such as good gel strength, while lowering the temperature needed for cooking as compared to conventional high amylose starches.

These and other aspects of the present invention may be more fully understood with reference to the following examples.

EXAMPLE 1

This example illustrates the extraction of the starch of the present invention from an aedu maize kernel produced by conventional crossbreeding and tests the starch to determine its various characteristics. The tests as well as the results obtained therefrom are given in Table I below. The extraction process as well as the test procedures followed are outlined following Table I below:

TABLE I

| Test | Present Invention | |
|---|---|---|
| | Sample A | Sample B |
| Percent Protein (dry basis) | 0.46% | 1.38% |
| Percent Oil (dry basis) | 0.17% | 0.09% |
| Percent Amylose (starch basis) | 51.0% | 53.0% |
| DSC Gelatinization Temp. | 69.1° C. | 69.5° C. |
| Regular Brabender Amylograms | | |
| Initial Rise | 84.5° C. | 92° C. |
| Heating Peak | 410 BU | 535 BU |
| Heating Final | 380 BU | 535 BU |
| Cooling Peak | 1980 BU | 960 BU |
| Cooling Final | 1980 BU | 960 BU |
| Acid Brabender Amylograms | | |
| Initial Rise | — °C. | 90.5° C. |
| Heating Peak | — BU | 480 BU |
| Heating Final | — BU | 180 BU |
| Cooling Peak | — BU | 2105 BU |
| Cooling Final | — BU | 2105 BU |
| Brookfield Viscosities (RPMs) | | |
| 10 | 72,000 cps | 38,000 cps |
| 20 | 44,000 cps | 33,000 cps |
| 50 | 22,000 cps | 17,600 cps |
| 100 | 12,600 cps | 11,200 cps |
| 50 | 20,800 cps | 14,800 cps |
| 20 | 43,000 cps | 31,000 cps |
| 10 | 74,000 cps | 36,000 cps |
| Hercules Viscosity (RPMs) | | |
| 550 | 24.36 cps | 444.8 cps |
| 1100 | 15.05 cps | 308.83 cps |
| 1650 | 15.66 cps | 238.96 cps |
| 2200 | 16.06 cps | 200.1 cps |
| 1650 | 19.14 cps | 213.99 cps |
| 1100 | 16.34 cps | 253.31 cps |
| 550 | 25.23 cps | 340.55 cps |

Crossbreeding

In order to perform the crossbreeding process, typically maize plants having the mutant gene ae were cross-pollinated with maize plants having the mutant gene du. From the mature ears of some of these plants, kernels having aedu homozygous genotype were produced. Such kernels were used to produce starch in accordance with the present invention and to provide seed for future maize plants of the aedu homozygous genotype.

Extraction Process

The following extraction process was used to extract the starch from the kernel. Sample A was grown in a dent corn background, OHIO 48, while Sample B was grown from a hybrid cross between a dent corn background of OHIO 48 homozygous for aedu genotype and a dent corn background of W64A homozygous for aedu genotype.

Steeping

Steeping was carried out by adding maize kernels to water having a 0.2% $SO_2$ content and holding the temperature of the steep water at 50° C. for 48 hours. The steep water was circulated through the steep container. After the 48 hours of steeping, the kernels were dewatered and washed with water.

Grinding and Separating

A mixture of 1:1 kernels to water in a weight ratio was prepared and added to a Waring blender equipped with a dull blade. The Waring blender was put on grind for one minute to mill the starch. The resulting mash was poured onto a 40 mesh screen and what passed through the 40 mesh screen was passed through a 200 mesh screen and subsequently through a 325 mesh screen. The resulting filtrate contained starch and protein. That which did not pass through the first 40 mesh screen was put back into the Waring blender with water in a 1:1 weight ratio. This time a sharp blade was used and the Waring blender was set for one minute on grind. The resulting mash was then subject to a 40 mesh screen and the filtrate was subjected to a 200 mesh screen and finally to a 325 mesh screen. The final filtrate from both the dull blade grind and the sharp blade grind were dewatered and contained starch and protein. The starch and protein were reslurried and subjected to three separate centrifuges to remove the starch from the protein.

The final starch was then filtered and dried in an oven at 110° C. overnight to a moisture content of approximately 10%.

In this manner, starch was extracted from corn kernels in the lab.

The percent protein was determined by a standard Corn Refiners Association (CRA) method (Kjeldahl method).

The percent oil was also done using a standard CRA method by extracting the oil from dry, ground kernels using carbon tetrachloride for sixteen hours.

The percent amylose was determined using standard colorimetric iodine procedures wherein the starch is first gelatinized with sodium hydroxide and then reacted with an iodine solution and the resulting sample measured using a spectrophotometer in a 1 cm cell at 600 nm against a blank of 2% iodine solution.

The DSC gelatinization temperature was measured using a scanning calorimeter manufactured by Mettler Model No. 300 using a 30% solid starch following the procedure outlined in the owner's manual for that model.

Two Brabender amylograms were run; one in a nonacid environment and one in an acid environment. Both were run at 12% solids using a 90 gram sample with 125 gram cartridge at 100 RPM. The exact procedure used is outlined in the Amylograph Handbook of the American Association of Cereal Chemists, 1982 edition at pages 17 and 18. The respective paddle for the 90 gram cup was used. The difference between the acid and the regular Brabender was that 1.56 grams of glacial acetic acid was added to the sample to drop the pH of the sample to about 3 prior to running of the samples. Such acid test is used to show stability in acid conditions. No acid Brabender was run for Sample A above.

The initial rise was the temperature at which the pen moves away from the baseline.

Both acid and regular samples were subjected to identical heat profiles. The sample started at room temperature and the rapid head mode of the intrument was used to heat the sample to 50° C. Once 50° C. was reached the instrument was set at a controlled rate of heating, 1½° C./minute, until a temperature of 95° C. was reached. The sample was then held at 95° C. for 30 minutes. During this period of heating, the highest viscosity obtained by the sample was labeled Heating Peak. The Heating Final was the last viscosity obtained by the sample at the end of the heating cycle. Next, the sample was cooled at 1½° C. to a temperature of 50° C. The sample was then held at 50° C. for 30 minutes. The largest viscosity measurement taken during this cooling cycle was the Cooling Peak and the final viscosity at the end of the cooling cycle was the Cooling Final.

Brabender curves are a well known tool for determining characteristics of starch.

Brookfield viscosities, another well known measurement used for analysing starch was measured for the starch of the present invention in Table I above. In order to run this test, the starch slurry as it came from the regular, non-acid Brabender test was used for the Brookfield test.

A Brookfield viscometer Model RV was used following standard procedures to obtain these values. The tests were run at 50° C. with each RPM being run for a twenty second one minute time interval.

Hercules viscosities were run on a Kaltec Model No. 244RC (manufactured August 31, 1975) following the procedure outlined in the operators manual. Each test was run at 75° F. using bob A. A 25 gram sample of starch paste as obtained from the acid Brabender was used for this test. Hercules viscosities measured high shear resistance of starch in an acid environment. Since Sample A had no acid Brabender run on it, this test was run on a 5.5% paste as obtained after a regular Brabender amylograph.

EXAMPLE 2

This example illustrates the high amylose content and low gelatinization temperature of the present invention compared to conventional high amylose starches. The results of this example are listed in Table II below:

TABLE II

| Starch Samples | % Amylose | Gelatinization Temperature °C. |
|---|---|---|
| 1. AMY V | 58.0 | 78.6 |
| 2. AMY VII | 69.7 | 80.0 |
| 3. Native aedu (Sample A) | 51.0 | 69.1 |
| 4. Native aedu (Sample B) | 53.0 | 69.5 |

AMY V and AMY VII are commercial products sold by American Maize-Products Company, Hammond, Ind. and are sold as high amylose starches. The % amylose and gelatinization temperature are mean values determined from a random sampling of product. The 99% confidence interval for the % amylose in AMY V and AMY VII respectively was 53.4 to 62.5 and 65.5 to 73.8. The 99% confidence interval for the gelatinization temperature for the AMY V and AMY VII respectively was 72.8 to 84.4 and 83.1 to 90.8. Both AMY V and AMY VII were grown in native maize. Starch Samples 3 and 4 correspond to Samples A and B of Example 1 above.

The percent amylose and gelatinization temperatures were obtained using the methods in Example 1 above.

It is readily apparent from Table II above that the starch of the present invention has a high amylose content, above about 50%, while also having a low gelatinization temperature, about 70° C.

It is also clear from Table II above that the starch of the present invention has a gelatinization temperature 5° C. less than high amylose starches with comparable amylose contents.

EXAMPLE 3

This example illustrates the synergistic nature of the starch of the present invention. The results of this example are listed in Table III below.

TABLE III

| Starch Samples | % Amylose | Gelatinization Temperature °C. |
|---|---|---|
| 1. Native, common maize | 27.6 | 70.8 |
| 2. Native, ae grown in OHIO 42 | 70.5 | 81.6 |
| 3. Native, ae grown in W64A | 68.0 | 84.7 |
| 4. Native, du grown in OHIO 42 | 33.2 | 72.3 |
| 5. Native, du grown in W64A | 38.8 | 72.5 |
| 6. Native, aedu grown in OHIO 42 | 51.0 | 69.1 |
| 7. Native, aedu grown in hybrid cross of OHIO 42 and W64A | 53.0 | 69.5 |

Sample 1 was a commercial product sold by American Maize-Products Company, Hammond, Ind. Both the percent amylose and the gelatinization temperature for Sample 1 in Table III above are mean values determined from a random sampling of product. The 99% confidence interval for the percent amylose and gelatinization temperature for Sample 1 were 25.9 to 29.3 and 68.7 to 72.7 respectively.

OHIO 42 and W64A have been identified in Example 1 above as type of common corn.

Samples 6 and 7 correspond to Samples A and B respectively of Example 1 above.

The starch in Samples 2-7 were extracted from corn kernels following the procedure outline in Example 1 above.

The method for determining both the percent amylose and the gelatinization temperature was that outlined in Example 1 above.

It is apparent that the starch of the present invention the amylose content equal to about the average for the individual parents i.e. ae grown in OHIO 42 plus du grown in OHIO 42 divided by two equals $(70.5+33.2) \div 2 = 59$ while exhibiting a gelatinization temperature lower than either of the individual parents i.e. $69.1 < 81.6$ or $72.3$. Such is truly synergistic.

EXAMPLE 4

This example illustrates gel strengths of a sol made from starch of the present invention compared to a sol made from a conventional high amylose starch. The results of this testing is reported in Table IV below.

TABLE IV

| | Sample B (Example 1) | AMY V |
|---|---|---|
| Percent Amylose | 53.0% | 57.0% |
| Gel Strength | Did not break | Did not break |

In order to perform the gel strength test reported in Table IV above, gels were prepared by mixing water with starch and subjecting the slurry to a non-acid Brabender and subsequently to a non-acid Brookfield viscosity test in accordance with Example 1 above. Both sols were made up at 12% by weight solids. Portions of these sols were added separately to 4 ounce jars into which a plunger was placed. The sols were then allowed to stand at ambient conditions for 24 hours. Gel strength was measured by determining the force needed to remove the plunger from the gel. In both cases, the plunger did not pull out of the gel but rather the plunger and gelatinized gel were pulled out of the 4 ounce jar together.

This example illustrates that the gel strength of a sol made in accordance with the present invention is comparable to a conventional high amylose starch sol.

EXAMPLE 5

This example illustrates the thin-thick attributes of the starch of the present invention.

The general attributes of a commercial thin-thick starch as shown by a non-acid Brabender amylogram run in accordance with Example 1 above at 5.5% solids shows a rise of not more than 300 BU during the addition of heat to the sample, a slow rise of viscosity during the hold at 95° C. cycle and continued gradual rise during the full cooling cycle. A gentle rise is about 10 BU per minute for the amylogram run in accordance with Example 1 above.

FIG. 1 illustrates the general amylogram for Sample B of Example 1. This amylogram was run in accordance with Example 1.

It is readily apparent that the starch of the present invention has an amylogram similar to that of thin-thick starch.

EXAMPLE 6

This example illustrates preparing a thickener composition in accordance with the present invention.

The starch of the present invention as extracted in Example 1 above is mixed with water in an amount to produce a slurry having 10% by weight starch. The slurry is cooked at about 90° C. for ten minutes to produce a thickener composition.

EXAMPLE 7

This example illustrates making a gum candy using the starch of the present invention.

The following ingredients and procedure is used:

TABLE V

| Ingredients | % by Weight Present Invention |
|---|---|
| 44/62 csu | 56.34 |
| Sugar, fine granular | 25.45 |
| Water | 7.73 |
| 90 Thin-Boiled Starch | 7.20 |
| Present Invention Starch | 3.13 |
| Citric Acid | 0.07 |
| Sodium Citrate | 0.08 |

Procedure

All ingredients are mixed and then cooked to 340° F. using conventional equipment such as a jet cooker. The cooked slurry is then poured into candy molds and allowed to solidify into a gum candy.

EXAMPLE 8

This example illustrates using the starch of the present invention for retort canning.

A medium is prepared by mixing 6% starch of the present invention with 90% water, 1% salt and 3% sugar. The pH of the system is adjusted to neutral, pH 6.5, with vinegar as needed. This medium is then mixed with foodstuffs, mixed vegetables. The final mixture contains about 50-60% by weight mixed vegetables. The final mixture is placed in a can and sealed. The sealed can is then subjected to retort conditions.

EXAMPLE 9

This example illustrates chemically modifying the starch of the present invention for use in canning. The chemical modification is esterification.

First a slurry is made up by mixing starch of the present invention with water to form a slurry containing starch in an amount of 35% by weight. To this slurry sodium hydroxide and acetic anhydride are added concurrently. The sodium hydroxide is added in an amount sufficient to bring the pH of the slurry to 8 while the acetic anhydride is added in an amount sufficient to obtain a 2% substitution on the starch. During the reaction, the temperature of the reaction vessel is maintained at 85° F. and under constant stirring. Once the 2% substitution has been obtained, approximately 2 hours, the pH of the slurry is dropped to 5 using a mineral acid. Subsequently the chemically modified starch is washed, dewatered and dried in a conventional manner.

In this manner esterification with acetic anhydride to obtain a 2% substitution of the starch of the present invention is obtained.

Although the use of the present invention has been disclosed primarily with respect to foods, this is not deemed to limit the scope of this invention. The present invention can be used in other fields of industry such as paints, plastics, paper, wallboards.

It will be understood that the claims are intended to cover all changes and modifications of the preferred embodiments of the invention herein chosen for the purposes of illustration which do not constitute a departure from the spirit and scope of the invention.

What is claimed is:

1. A thickened foodstuff for canning comprising a foodstuff, water and having as an essential ingredient therein an effective amount of a natural thin-thick starch, said starch extracted from a starch bearing plant having an amylose extender dull genotype, said starch providing no effective thickening characteristics to said foodstuff before canning while providing effective thickening characteristics to said foodstuff after canning.

2. The thickened foodstuff of claim 1 wherein the starch bearing plant is maize and the starch is extracted from kernels of maize.

3. The thickened foodstuff of claim 1 wherein the amount of starch present is about 1% to about 20% by weight based on total weight of thickened foodstuff.

4. The thickened foodstuff of claim 3 wherein the starch bearing plant is maize and the starch is extracted from kernels of maize.

5. The method of claim 1 wherein the water and starch are combined together first and then subsequently combined with the foodstuff.

6. The method of claim 1 wherein the amount of starch added is about 1% to about 20% by weight based on total weight of foodstuff.

7. A method for making a thickened foodstuff comprising combining a foodstuff, water and an effective amount of a natural thin-thick starch, said starch extracted from a starch bearing plant having an amylose extender dull genotype and subjecting said combination to a canning process whereby said starch provides no effective thickening characteristics to said foodstuff before scanning while providing effective thickening characteristics to said foodstuff after canning.

8. The method of claim 7 wherein the starch is extracted from a maize kernel.

9. The starch of claim 8 in granular form.

10. In a method of canning comprising combining a foodstuff, a starch and water, and subjecting the combination to a sterilization process, the improvement comprising the an effective amount of substantially pure starch extracted from a starch bearing plant having an amylose extender dull genotype.

* * * * *

UNITED STATES PATENT AND TRADEMARK OFFICE
CERTIFICATE OF CORRECTION

PATENT NO. : 4,790,997
DATED : December 13, 1988
INVENTOR(S) : Robert B. Friedman et al.

It is certified that error appears in the above-identified patent and that said Letters Patent are hereby corrected as shown below:

Column 13, line 1, change the dependency from "claim 1" to --claim 7--.

Column 13, line 4, change the dependency from "claim 1" to --claim 8--.

Column 14, line 1, change "scanning" to --canning--.

Column 14, line 10, after "the" insert --step of employing--.

Signed and Sealed this

Ninth Day of May, 1989

Attest:

DONALD J. QUIGG

*Attesting Officer*   *Commissioner of Patents and Trademarks*